United States Patent [19]

Kulyk

[11] Patent Number: 5,244,173
[45] Date of Patent: Sep. 14, 1993

[54] HOLDER FOR REMOTE CONTROL UNITS

[76] Inventor: Barry Kulyk, 401-420 Catherine Street, Victoria, British Columbia, Canada, V9A 3T1

[21] Appl. No.: 774,879

[22] Filed: Oct. 11, 1991

[51] Int. Cl.$^5$ .......................................... F16M 11/00
[52] U.S. Cl. ...................................... 248/176; 211/13; 229/122; 229/120.12
[58] Field of Search .............. 248/176, 146, 148, 346, 248/154, 205.1; 211/126, 133, 13, 26; 206/232, 305, 320, 328; 229/122, 120.12; 220/503

[56] References Cited

U.S. PATENT DOCUMENTS

| | | |
|---|---|---|
| D. 300,432 | 3/1989 | Zvehsow . |
| D. 310,367 | 9/1990 | Dockery . |
| 1,105,835 | 8/1914 | Radley ................................ 40/120 |
| 1,324,669 | 12/1919 | Harris ............................. 206/45.27 |
| 1,565,672 | 12/1925 | Rhodes ................................ 211/133 |
| 1,634,715 | 7/1927 | Huebner ............................. 211/133 |
| 2,300,412 | 11/1942 | Fink ............................... 211/133 X |
| 2,746,702 | 5/1956 | Gourley et al. ...................... 248/176 |
| 2,883,792 | 4/1959 | Marono ............................... 248/146 |
| 3,182,792 | 5/1965 | Viltrakis ........................ 229/122 X |
| 3,994,596 | 11/1976 | Tillen et al. ................... 211/133 X |
| 4,044,980 | 8/1977 | Cummins . |
| 4,050,658 | 9/1977 | Forman . |
| 4,053,047 | 10/1977 | Andreaggi . |
| 4,090,613 | 5/1978 | McPherson ..................... 248/346 X |
| 4,165,554 | 8/1979 | Faget . |
| 4,259,568 | 3/1981 | Dynesen ............................. 206/305 |
| 4,303,156 | 12/1981 | Vucich . |
| 4,369,887 | 1/1983 | Emery ............................. 211/133 X |
| 4,676,372 | 6/1987 | Rager .............................. 206/232 X |
| 4,733,776 | 3/1988 | Ward . |
| 4,739,897 | 4/1988 | Butler ................................ 206/320 |
| 4,762,227 | 8/1988 | Patterson . |
| 4,815,683 | 3/1989 | Ferrante . |
| 4,836,256 | 6/1989 | Meliconi . |
| 4,838,505 | 6/1989 | Lowe . |
| 4,848,609 | 7/1989 | Meghnot . |
| 4,860,910 | 8/1989 | Zipper ................................ 220/503 |
| 4,991,817 | 2/1991 | Vonkleist et al. ................... 248/676 |
| 5,042,670 | 8/1991 | Timberlake ..................... 248/176 X |

OTHER PUBLICATIONS

"Remote Mate" Remote Command Unit TM, M&F Industries.

Primary Examiner—Blair M. Johnson
Assistant Examiner—Korie H. Chan
Attorney, Agent, or Firm—Norman M. Cameron

[57] ABSTRACT

A holder for remote control units having a body with a bottom configured to rest on a horizontal plane in use. The body has a front, a back and a surface which is inclined upwardly from the back to the front of the body in use. At least a portion of the surface is of a high friction material, whereby remote control units resting on the surface are angled upwardly toward the front of the body and are inhibited from side-to-side movement by the high friction material.

1 Claim, 2 Drawing Sheets

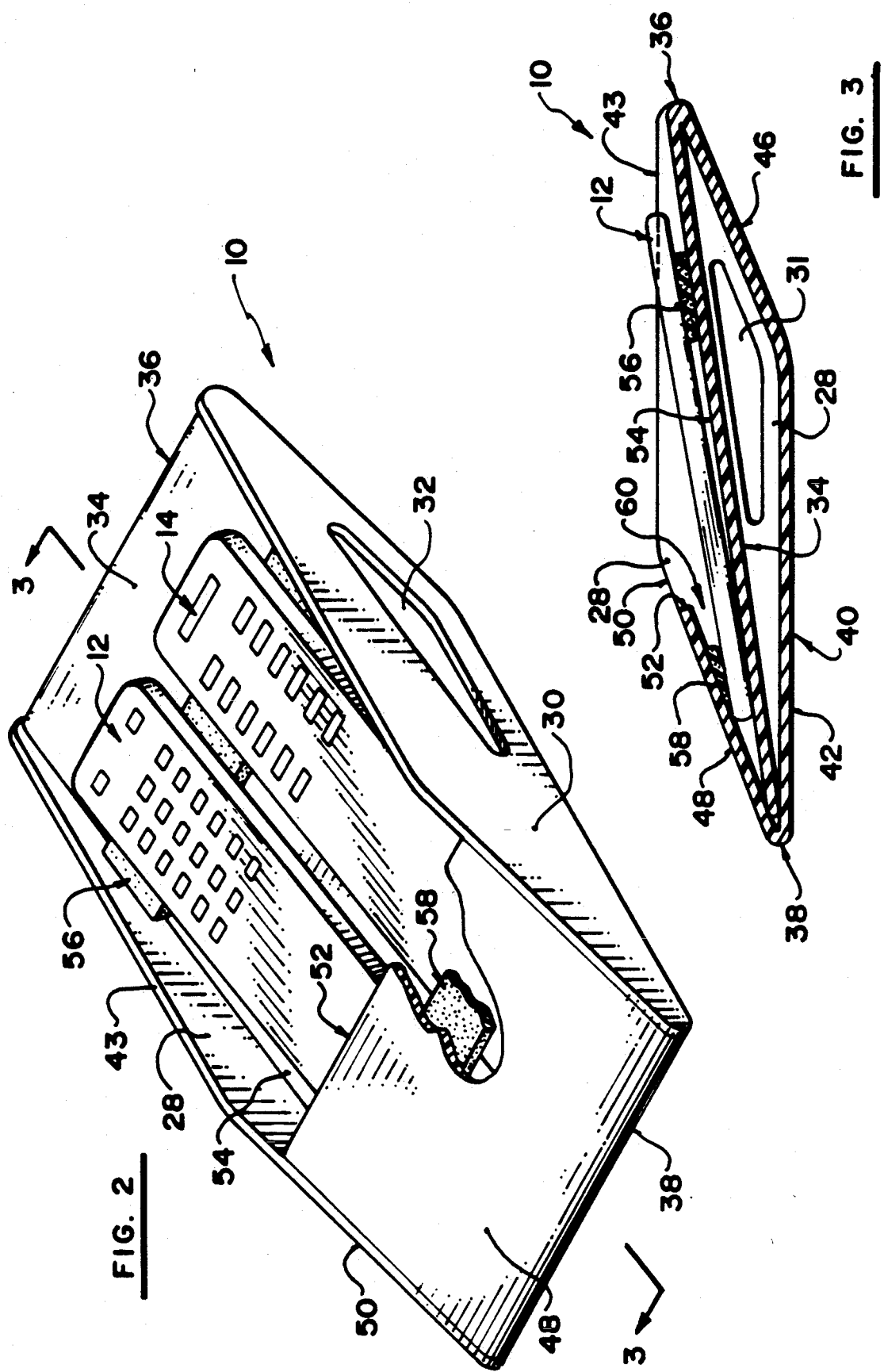

HOLDER FOR REMOTE CONTROL UNITS

BACKGROUND OF THE INVENTION

1. Field of the Invention

This invention relates to holders for remote control units for television sets, video recorders and similar appliances, and in particular to holders which are adapted to hold the remote control units in a suitable orientation for use without removing the units from the holders.

2. Description of Related Art

Remote control units are widely used to control television sets, video recorders and other appliances such as stereo equipment. Therefore two or more remote control units must often be on hand for an audience being entertained by these appliances. Often such remote control units are misplaced because of their relatively small size. They may become hidden within or under furniture, books, or taken from the appropriate room and not returned. In addition, when two or more people are simultaneously using the appliances, each of them should have ready access to the remote control units to change television stations or adjust the volume of the sound, for example.

Holders have been developed in the past for remote control units, but they are intended to hold the units when they are not in use and not in a position where they can be used while located in the holder. Examples of these are found in U.S. Pat. Nos. 4,733,776 to Ward, 4,836,256 to Meliconi and in U.S. Des. Pat. No. 300,432 to Zuehsow. None of these units is adapted to hold two or more remote control units, nor to hold a remote control in a position suitable for use.

Stands which are angled upwardly have been developed in the past, such as found in U.S. Pat. Nos. 4,044,980 to Cummins and 4,053,047 to Andreaggi, but these stands are intended for portable electronic calculators and not for remote control units.

SUMMARY OF THE INVENTION

It is an object of this invention to provide an improved holder for remote control units for electronic appliances which is capable of holding the units in an orientation suitable for use.

It is also an object of the invention to provide an improved holder capable of holding two or more such remote control units at once.

It is a further object of the invention to provide an improved holder for remote control units which holds the remote control units securely in normal use, but allows the units to be easily removed from the holder when desired.

In accordance with these objects, the invention provides a holder for remote control units comprising a body having a bottom configured to rest on a horizontal plane in use, a front, a back and a surface which is inclined upwardly from the back to the front of the body in use. At least a portion of the surface is of a high friction material, whereby remote control units resting on the surface are angled upwardly toward the front of the body and are inhibited from side-to-side movement by the high friction material.

Preferably the body includes a member which extends above the surface near the back of the body, forming a pocket between the member and the surface for receiving rear portions of the remote control units.

In one embodiment of the invention, at least a portion of the member facing the surface is of a high friction material.

BRIEF DESCRIPTION OF THE DRAWINGS

FIG. 2 is an enlarged isometric view of the holder of FIG. 1 with the two remote control units located therein, a portion of the holder being broken away; and FIG. 3 is a sectional view taken along line 3—3 of FIG. 2.

DESCRIPTION OF THE PREFERRED EMBODIMENTS

Figure 1:
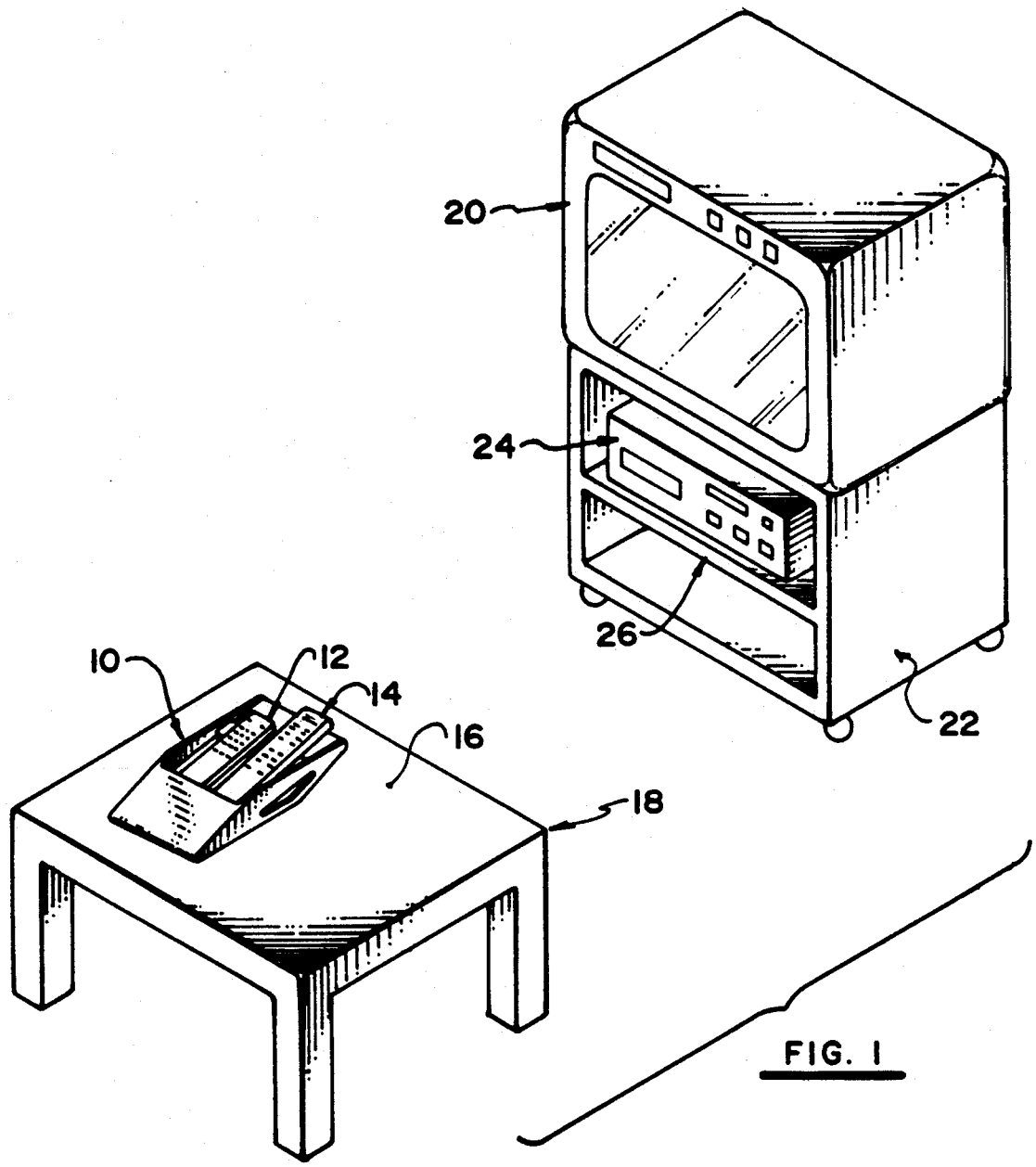
FIG. 1 is an isometric view of a holder for remote control units with a pair of remote control units located therein and resting on a table in front of a television set and a video recorder.

Referring to the drawings, and to FIG. 1 in particular, this shows a holder 10 for remote control units such as units 12 and 14 shown located therein. The holder is shown resting on a horizontal plane formed by top 16 of a table 18. The remote control units are shown angled upwardly and pointed towards a television set 20 resting on a stand 22 which has a video cassette recorder 24 located on shelf 26 thereof. The holder 10 is of a rigid plastic material in this example, although other materials could be used, and is formed by a plurality of thin, generally flat planar members which are referred to as "members" hereafter.

As seen in better detail in FIG. 2, the holder 10 has a top 43 and trapezoidal side members 28 and 30 which in this embodiment have triangular openings 31 and 32 serving to hold a magazine with television listings. There is a member 34 extending from front 36 of the holder to its back 38 between diagonally opposite corners of the sides as best seen in the sectional view of FIG. 3. There is a rectangular member 40 extending along bottom 42 of the holder so the bottom is thus configured to rest on a horizontal plane such as the coffee table shown in FIG. 1. Member 40 curves upwardly near the front thereof to merge with rectangular member 46 which extends to the front 36 of the holder.

There is a further rectangular member 48 near the back of the holder. Member 48 is inclined upwardly towards front 36 of the holder at an angle greater than the angle of member 34. In this way, member 48 extends over member 34 forwardly of back 38 of the holder as seen best in FIG. 3. Member 48 extends along the back of each of the trapezoidal sides, such as back 50 of side 28 shown in FIG. 3. Front 52 of member 48 extends only a fraction of the distance along member 34 from back 38 to front 36 of the holder, thus leaving most of upper surface 54 of member 34 exposed between the front of member 48 and the front of the holder.

A high friction strip 56, of rubber in this example, extends transversely across surface 54 near the front of the holder and is affixed thereto by a suitable adhesive. A similar downward facing strip 58 is affixed to the inside of member 48 facing surface 54. The strip is located within a wedge-shaped pocket 60 formed between member 48 and the rear portion of member 34. The rear portion of the remote control units are wedged within the pocket between strip 58 and surface 54 of member 34. Strip 56 is received under the remote control units near the fronts thereof.

In use, the remote control units have the rear portions thereof inserted into the pocket 60 and pushed rearwardly until they become wedged in the pocket between the strip 58 and upper surface 54 of member 34. This wedging action tends to push the fronts of the remote control units downwardly against strip 56. The action of the strips 56 and 58 holds the remote control units 12 and 14 firmly in place, particularly with respect to side-to-side movement. Forward and rearward movement of the remote control units relative to the holder is inhibited by the wedging of the rear portions of the remote control units between strip 58 and surface 54. Thus, in normal use, the remote control units are held firmly in place. However, each unit can be removed quite easily by grasping the units with the fingers about their front ends and lifting upwardly and forwardly to remove them from the pocket 60.

The holder 10 would normally be positioned on a horizontal plane, such as the top of the coffee table 18 shown in FIG. 1. The holder is oriented so that the remote control units are aimed towards television set 20 and VCR 24. The upward angle of the remote control units when positioned in the holder 10 ensures that they are directed towards the appliances even if the coffee table is lower than the appliance, such as the television set in this instance.

It will be understood by someone skilled in the art that many of the details described above are by way of example only and can be changed without departing from the scope of the invention which is to be interpreted with reference to the following claims.

What is claimed is:

1. In combination:

a holder for remote control units comprising a first planar member, a second planar member, and a bottom planar member, each of the planar members having a front edge, a rear edge opposite the front edge, and opposite side edges, the first planar member being connected to the bottom planar member at their respective rear edges, the first planar member being inclined upwardly at an acute angle from the rear edge of the bottom planar member, the first planar member extending above and beyond the front edge of the bottom planar member, the rear edge of the second planar member being connected to the rear edges of the first planar member and the bottom planar member, the second planar member extending above and toward the front edge of the first planar member but leaving most of the first planar member uncovered, the second planar member being inclined less acutely with respect to the bottom planar member than the first planar member, a pair of vertical side members, each of said vertical side members being secured to a respective one of the opposite side edges of the planar members, a first resilient strip extending transversely across the first planar member and a second resilient strip extending transversely across the second planar member, the first resilient strip being closer to the front edge of the first planar member than the second resilient strip; and at least two remote control units, each having a front, a bottom resting on said first planar member, a rear portion wedged between the first planar member and the second planar member, and a top, wherein most of the top of each unit is exposed forwardly of the second planar member, the first resilient strip contacting the bottom of each unit and the second resilient strip contacting the top of said each unit, whereby the remote control units are inclined upwardly towards the front edge of the first planar member when held in the holder.

* * * * *